(12) United States Patent
Little et al.

(10) Patent No.: US 8,972,738 B2
(45) Date of Patent: *Mar. 3, 2015

(54) INCORPORATING DATA INTO AN ECDSA SIGNATURE COMPONENT

(71) Applicants: Certicom Corp., Mississauga (CA); Blackberry Limited, Waterloo (CA)

(72) Inventors: Herbert Anthony Little, Waterloo (CA); Scott Alexander Vanstone, Campbellville (CA); Daniel Richard L. Brown, Mississauga (CA); Matthew John Campagna, Ridgefield, CT (US)

(73) Assignees: Blackberry Limited, Waterloo (CA); Certicom Corp., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/218,513

(22) Filed: Mar. 18, 2014

(65) Prior Publication Data

US 2014/0201535 A1    Jul. 17, 2014

Related U.S. Application Data

(63) Continuation of application No. 13/070,226, filed on Mar. 23, 2011, now Pat. No. 8,675,869.

(51) Int. Cl.
  *H04L 9/32* (2006.01)
  *H04L 9/30* (2006.01)

(52) U.S. Cl.
  CPC ............ *H04L 9/3066* (2013.01); *H04L 9/3252* (2013.01); *H04L 2209/38* (2013.01); *H04L 2209/80* (2013.01)
  USPC .......................................... 713/180; 713/176

(58) Field of Classification Search
  USPC ................................................... 713/180, 176
  See application file for complete search history.

(56) References Cited

U.S. PATENT DOCUMENTS

| 6,163,841 | A  | * | 12/2000 | Venkatesan et al. ........... 713/176 |
| 6,209,093 | B1 | * | 3/2001  | Venkatesan et al. ........... 713/176 |
| 6,389,537 | B1 | * | 5/2002  | Davis et al. ................... 713/187 |
| 7,093,130 | B1 | * | 8/2006  | Kobayashi et al. ........... 713/176 |
| 7,941,667 | B2 | * | 5/2011  | Miyazaki et al. .............. 713/176 |
| 7,971,063 | B2 | * | 6/2011  | Guenther ...................... 713/176 |

(Continued)

FOREIGN PATENT DOCUMENTS

| EP | 1083700 | 3/2001 |
| EP | 2302834 | 3/2011 |

(Continued)

OTHER PUBLICATIONS

Non-Final Office Action mailed Feb. 4, 2014; in U.S. Appl. No. 13/070,178.

(Continued)

*Primary Examiner* — Amare F Tabor
(74) *Attorney, Agent, or Firm* — Novak Druce Connolly Bove + Quigg LLP

(57) ABSTRACT

During generation of a signature on a message to create a signed message, a signer determines one of the signature components such that particular information can be extracted from the signature component. The particular information may be related to one or more of the signer and the message to be signed. After receiving a signed message purported to be signed by the signer, a verifier can extract the particular information from the signature component.

15 Claims, 7 Drawing Sheets

(56) References Cited

U.S. PATENT DOCUMENTS

| | | | |
|---|---|---|---|
| 8,009,829 | B2 | 8/2011 | Jueneman et al. |
| 8,386,790 | B2 | 2/2013 | Bhattacharya et al. |
| 2005/0195975 | A1* | 9/2005 | Kawakita ............... 380/30 |
| 2007/0064932 | A1 | 3/2007 | Struik et al. |
| 2008/0301459 | A1 | 12/2008 | Ebeid |
| 2009/0022311 | A1 | 1/2009 | Vanstone et al. |
| 2010/0023771 | A1 | 1/2010 | Struik |
| 2010/0106973 | A1* | 4/2010 | Guenther ............... 713/176 |
| 2010/0166188 | A1 | 7/2010 | Qu et al. |
| 2010/0308978 | A1 | 12/2010 | Brown |
| 2011/0055585 | A1* | 3/2011 | Lee ............... 713/183 |

FOREIGN PATENT DOCUMENTS

| | | |
|---|---|---|
| WO | 2009009868 | 1/2009 |
| WO | 2009030021 | 3/2009 |
| WO | 2009090519 | 7/2009 |
| WO | 2010124390 | 11/2010 |
| WO | 2010129694 | 11/2010 |

OTHER PUBLICATIONS

Examination report mailed Jan. 29, 2014; in European patent application No. 11162141.3.

Examination Report mailed Jul. 16, 2014; in European patent application No. 11162141.3.

Johnson, Don; "The Elliptic Curve Digital Signature Algorithm (ECDSA)"; International Journal of Information Security, vol. 1, issue ; published on Jul. 27, 2001.

Menezes, A.; "Chapter 11: Digital Signatures", Handbook of Applied Cryptography, CRC Press, pp. 425-488, 1996, XP001525011, ISBN: 978-0-8493-8523-0; http://www.cacr.math.uwaterloo.ca/hac/ISBN: 978-0-8493-8523-0; http://www.cacr.math.uwaterloo.ca/hac; published on 1996.

Young; "Chapter 10: Subliminal Channels", In: "Malicious Cryptography", 2014, Wiley, XP055125873, pp. 211-228.

Office Action mailed Dec. 9, 2013; in corresponding Canadian patent application No. 2,768,861.

Examination Report mailed Oct. 18, 2013; in corresponding European patent application No. 11162139.7.

The International Search Report and Written Opinion mailed Nov. 28, 2012; in corresponding PCT patent application No. PCT/IB2012/051259.

ANSI X9.62:2005; Public Key Cryptography for the Financial Services Industry; The Elliptical Curve Digital Signature Algorithm (ECDSA); Nov. 16, 2005.

Extended European Search Report mailed Dec. 5, 2011; in corresponding European patent application No. 11162139.7.

Struik et al.; SEC 4: Elliptical Curve Qu-Vanstone Implicit Certificates Scheme (ECQV), vol. 91; Internet Citation, Nov. 18, 2008 ; p. 22PP, XP007914511; Retrieved from the internet URL: http://www.secg.org/download/ aid-775/sec4-ECQV-v091.pdf.retrieved on Aug. 18, 2010.

Extended European Search Report mailed Dec. 5, 2011; in corresponding European patent application No. 11162141.3.

PKCS #1 v2.1: RSA Cryptography Standard, RSA Laboratories; Bedford, MA, Jun. 14, 2002.

PKCS #10 v1.7: Certification Request Syntax Standard; RSA Laboratories; Bedford, MA, May 26, 2000.

Standards for Efficient Cryptography, SEC 1: Elliptic Curve Cryptography; Certicom Research, Sep. 20, 2000.

Standards for Efficient Cryptography, SEC 4: Elliptic Curve Cryptography; Certicom Research, Jun. 9, 2006.

Final Office Action mailed Aug. 28, 2014; in U.S. Appl. No. 13/070,178.

Notice of Allowance and Fee(s) Due mailed Nov. 7, 2014; in U.S. Appl. No. 13/070,178.

* cited by examiner

INCORPORATING DATA INTO AN ECDSA SIGNATURE COMPONENT

CROSS-REFERENCE TO RELATED APPLICATION

The present application is a continuation of U.S. patent application Ser. No. 13/070,226 filed Mar. 23, 2011, which issued as U.S. Pat. No. 8,675,869 and is incorporated by reference herein in its entirety.

TECHNICAL FIELD

The technology described herein relates generally to elliptic curve cryptography, and particularly to the generation of cryptographic keys and digital signatures.

BACKGROUND

Elliptic curve cryptography (ECC) is based on the intractability of the discrete logarithm problem within a group over a finite field where the elements of the group are points on an elliptic curve. Cryptographic values generated using ECC schemes, such as the Elliptic Curve Digital Signature Algorithm (ECDSA), may be smaller than those generated using finite-field cryptography schemes, such as the Digital Signature Algorithm (DSA) and integer factorization cryptography schemes, such as the Rivest Shamir Adleman (RSA) algorithm, while still offering the same level of security. Smaller-sized cryptographic values are desirable because they may reduce storage and transmission requirements. ECDSA is described, for example, in "American National Standard for Financial Services ANS X9.62-2005: Public Key Cryptography for the Financial Services Industry—The Elliptic Curve Digital Signature Algorithm (ECDSA)", Accredited Standards Committee X9, Inc., 2005. DSA and RSA are described, for example, in "Federal Information Processing Standards Publication 186-3 Digital Signature Standard (DSS)", National Institute of Standards and Technology, June 2009.

BRIEF DESCRIPTION OF THE DRAWINGS

The figures of the accompanying drawings are intended to illustrate by way of example and not limitation. Like reference numbers in the figures indicate corresponding, analogous or similar elements.

DETAILED DESCRIPTION

Figure 1:
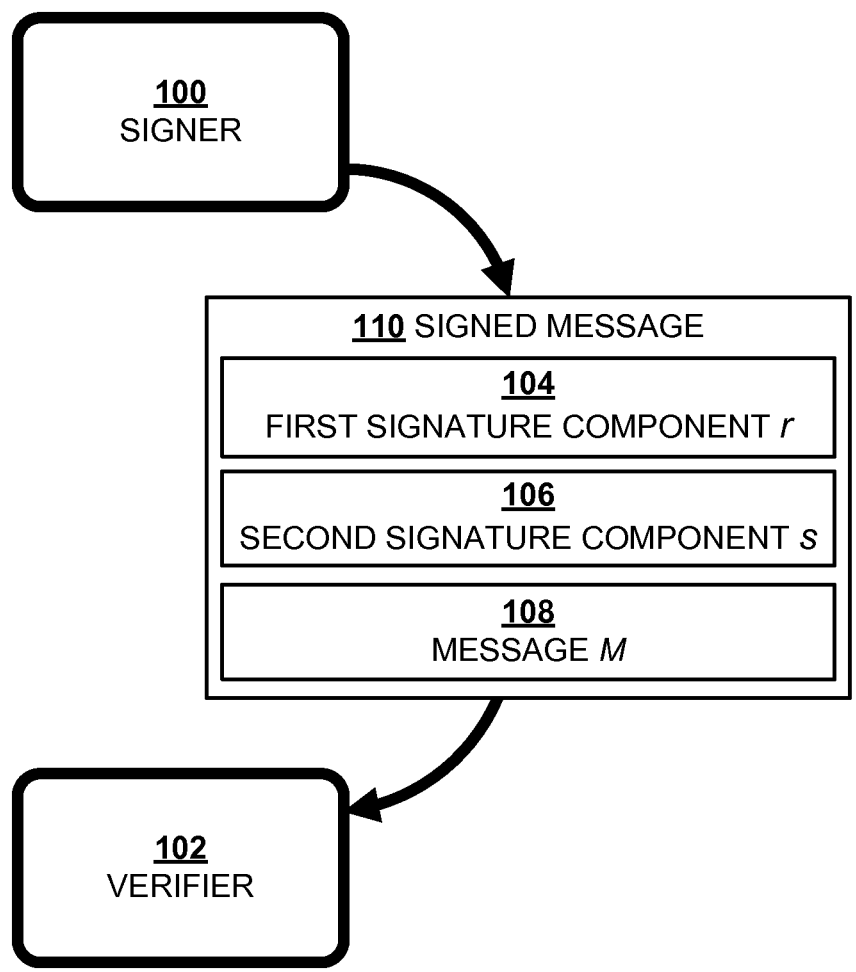
FIG. 1 is a simplified block diagram of an example ECDSA signature scheme for a signer and a verifier.

ECC offers an advantage over other cryptographic algorithms, such as DSA and RSA, in that it uses smaller cryptographic values to provide roughly the same level of security. For example, an ECDSA public key that is 160 bits can provide roughly the same level of security as a DSA public key that is 1024 bits. The use of smaller-sized cryptographic values means that related computations require less processing power or less time or both. This makes ECC-based protocols of interest for application environments where resources such as bandwidth, computing power, and storage, are limited.

ECC-based protocols rely on the intractability of the elliptic curve discrete logarithm problem. Given publicly-known points G and Q on an elliptic curve E, where point Q is equal to a product of a scalar multiplying factor d and point G, that is Q=dG, it is conjecturally very difficult to determine scalar multiplying factor d. With known algorithms, the computational difficulty of solving this problem increases exponentially with the size of the subgroup generated by G.

To implement an ECC-based protocol, all participants must agree on the domain parameters of the elliptic curve. An elliptic curve E defined over a prime finite field $\mathbb{F}_p$, that is E($\mathbb{F}_p$), is defined by elliptic curve domain parameters D=(p, a, b, G, n, h), where p is an odd prime number that represents the number of elements in the field, integers a and b are elements of prime finite field $\mathbb{F}_p$ that that satisfy, for example, $4a^3 + 27b^2 \neq 0 \pmod{p}$, (however curves specified by another equation may be suitable), G is a base point on elliptic curve E($\mathbb{F}_p$) that has order n, where n is defined as the smallest positive prime number such that a product of prime number n and base point G is equal to a point at infinity O, that is nG=O, and cofactor h is defined as a ratio of the number of points #E($\mathbb{F}_p$) on elliptic curve E($\mathbb{F}_p$) over prime number n, that is h=#E($\mathbb{F}_p$)/n. (Alternatively, elliptic curve E could be defined over a characteristic 2 finite field $\mathbb{F}_{2^m}$, where m is a prime number that is greater than or equal to one, that is m≤1.) Arithmetic in subgroups of E($\mathbb{F}_p$) may be written additively, where the sum of two points P and Q is P+Q, and scalar multiplication by an integer k is kP. Further details of existing ECC-based protocols are described in "Standards for Efficient Cryptography SEC1: Elliptic Curve Cryptography", Certicom Research, Certicom Corp., 2000, and "Standards for Efficient Cryptography SEC2: Recommended Elliptic Curve Domain Parameters version 2.0", Certicom Research, Certicom Corp., 2000.

In addition to satisfying $4a^3 + 27b^2 \neq 0 \pmod{p}$, elliptic curve domain parameters D may need to satisfy other constraints for cryptographic applications. For example, elliptic curve domain parameters D should be generated such that the number of points #E($\mathbb{F}_p$) on elliptic curve E($\mathbb{F}_p$) is not equal to the number of elements in prime finite field $\mathbb{F}_p$, that is #E($\mathbb{F}_p$)≠p, and such that odd prime p raised to any integer B, where 1≤B≤20, is not equal to one modulo prime number n, that is $p^B \neq 1 \pmod{n}$. Elliptic curve domain parameters D should also be generated such that cofactor h is small, specifically such that cofactor h is less than or equal to four, that is h≤4, and preferably such that cofactor h is equal to one, that is h=1. Recommended elliptic curve domain parameters D are published by standard bodies, such as the National Institute of Standards and Technology (NIST).

Once participants have agreed on the domain parameters of an elliptic curve, they can implement ECC-based protocols. Examples of ECC-based protocols include the Elliptic Curve Diffie-Hellman (ECDH) key agreement scheme, the Elliptic Curve Menezes-Qu-Vanstone (ECMQV) key agreement scheme, the Elliptic Curve Integrated Encryption Scheme (ECIES) public-key encryption scheme, and the previously mentioned ECDSA signature scheme.

Perhaps the simplest example of an ECC-based protocol is the generation of an elliptic curve key pair. Given valid elliptic curve domain parameters D=(p, a, b, G, n, h) associated with an elliptic curve E, an elliptic curve key pair (d, Q) can be generated using the following procedure. First, an integer d is randomly or pseudo-randomly selected within an interval [1, n−1]. Next, integer d is used in a scalar multiplication of base point G to obtain a new point Q on elliptic curve E, such that Q=dG. Scalar multiplication of a point on an elliptic curve, also known as point multiplication, can be computed efficiently using the addition rule with the double-and-add algorithm or one of its variants. These rules are known to those of ordinary skill in the art. Upon determining point Q, the pair (d, Q) can be used as a key pair, where integer d is a private key and point Q is a public key. While the point multiplication used to calculate public key Q from private key d and base point G is relatively straightforward, the inverse of this operation is extremely difficult. In general, ECC-based protocols rely on the difficulty of this operation.

A framework is herein proposed whereby, during the generation of a signed message by a signer, information is incorporated in a signature component of the signed message. This information may be related to, for example, one or more of the signer, the message being signed, and any other information not explicitly sent in the message being signed. In one example, the message being signed could be a certificate and the signer could be a certificate authority.

If part of the message to be signed forms a portion of the information to be incorporated in the signature component, the overall size of the signed message can be reduced because the message can be reduced by the part that is incorporated in the signature component. A reduction in the size of the signed message may reduce one or more of the requirements for bandwidth, computing power, and storage.

In the following examples, it may be assumed, unless otherwise stated, that all participants in a cryptographic scheme have agreed on suitable domain parameters. For example, for a scheme instantiated using a group of points on an elliptic curve, the participants agree on the corresponding elliptic curve domain parameters D=(p, a, b, G, n, h) as described above. Furthermore, in the case of certificate schemes or digital signature schemes, it may be assumed that all participants are in possession of the relevant public key of the CA or the signer, respectively. It may be assumed, unless otherwise stated, that implicit certificates are generated according to the ECQV implicit certificate scheme.

FIG. 1 is a simplified block diagram of an example ECDSA signature scheme involving a signer 100 and a verifier 102. Signer 100 generates a first signature component r 104 and a second signature component s 106 on a message M 108 to create a signed message M 110. Signed message M 110 is sent from signer 100 to verifier 102 for verification.

While the digital signature schemes described herein are instantiated using a group of points on an elliptic curve, they could alternatively be instantiated using any finite cyclic group, for example, a subgroup of $\mathbb{Z}_p$, the group of integers modulo a prime number p. In this case, the group order is p−1 and a generator G generates a subgroup of order n, where n divides p−1. Traditionally, arithmetic in subgroups of $\mathbb{Z}_p$ is written multiplicatively, where the product of two elements P and Q is PQ, and the analogue of scalar multiplication by an integer k is exponentiation, that is, $P^k$.

Figure 2:
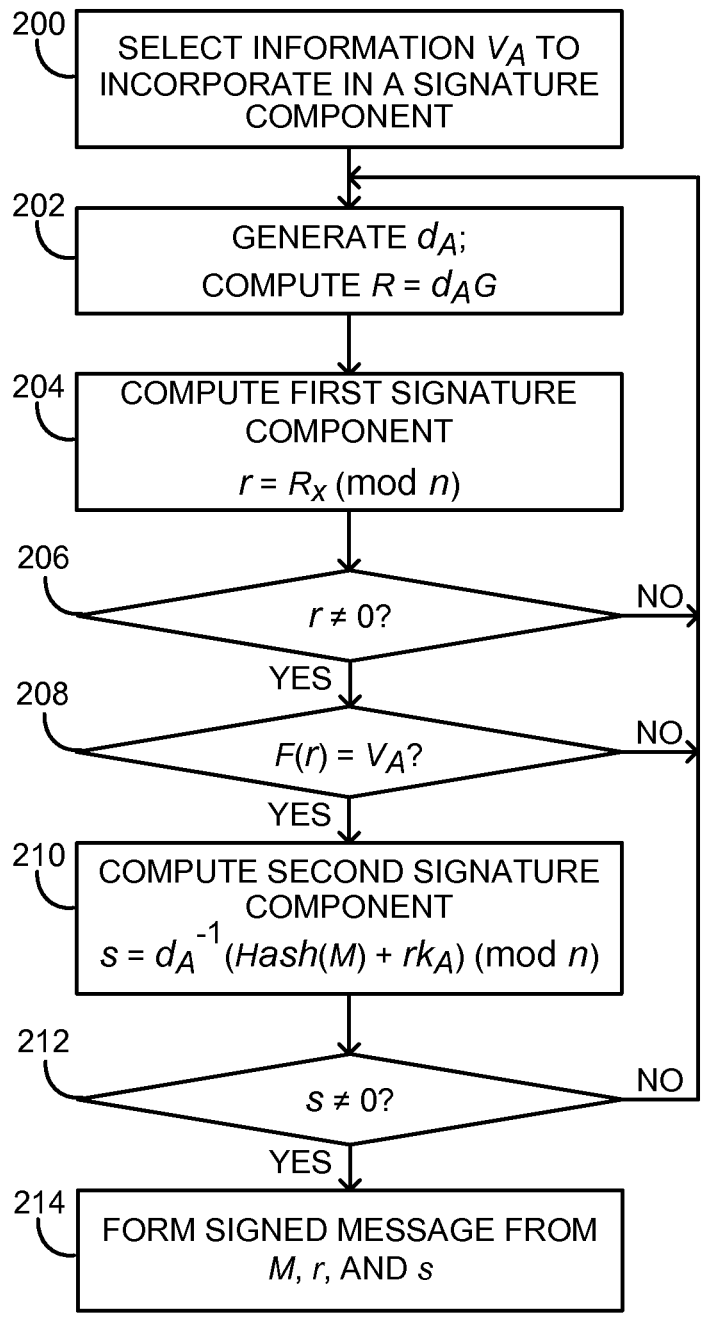
FIG. 2 is a simplified flowchart of an example method to be performed by a signer for incorporating information in a first signature component of an ECDSA signature.

FIG. 2 is a simplified flowchart of an example method to be performed by a signer for incorporating information in a first signature component of an ECDSA signature. A message M is to be signed by a signer, where the signer has a public key $K_A$ that is equal to a product of a private key $k_A$ of the signer and a base point G, that is $K_A=k_A G$, where base point G is a base point on elliptic curve E. As an example, message M may be a certificate and the signer may be a certificate authority. However, other messages and signers are contemplated.

At 200, the signer selects information $V_A$ to incorporate in a signature component of message M. In this case, the signature component is a first signature component r. Information $V_A$ may be related to, for example, to one or more of the signer and the message being signed. It is expected that information $V_A$ is from a relatively small set, for example, a set of cardinality $<2^{32}$. In practice, the cardinality is limited by the computational capability of the signer to handle the processing required to determine first signature component r that incorporates information $V_A$.

At 202, the signer generates a random or pseudo-random integer $d_A$ in an interval [1, n−1], where $d_A$ is a private value of the signer that should not be disclosed to other entities. From private value $d_A$, the signer computes a public value R, such that public value R is equal to a product of private value $d_A$ and base point G, that is $R=d_A G$.

At 204, the signer computes first signature component r as the residue of the x-coordinate of public value R modulo prime number n, that is $r=R_x \pmod{n}$. At 206, the signer determines whether first signature component r is non-zero, that is $r \neq 0$. If this condition is not satisfied, the signer returns to 202, generating a new private value $d_A$ and computing a corresponding new public value R. The signer then computes a new first signature component r at 204. If the signer determines at 206 that new first signature component r is non-zero, that is 'new r'≠0, the signer proceeds at 208 to check whether application of a known function F to new first signature component r results in information $V_A$, that is $F(\text{'new r'})=V_A$. It is contemplated that the verifications at 206 and 208 may be performed in a different order than that illustrated in FIG. 2, while still yielding the same results.

Numerous functions F are contemplated. As a simple example, function F could extract a subset of the bits from first signature component r, such as the first 20 bits or the last 20 bits of 160-bit first signature component r, for example. Alternatively, a more complicated function F could be used, such as a decompression algorithm or a function that adds certain bits of first signature component r together. Regardless of how function F is defined, it must be agreed on by all entities involved in the ECC-based protocol if information $V_A$ is to be incorporated in first signature component r and extracted from first signature component r at some later point in time.

Returning to the example method illustrated in FIG. 2, if the signer determines at 208 that application of function F to new first signature component r does not result in information $V_A$, that is $F(\text{'new r'}) \neq V_A$, then the signer returns to 202, generating a further new private value $d_A$ and computing a further new public value R. Then the signer proceeds at 204 to compute a further new first signature component r from further new public value R. The signer checks at 206 whether further new first signature component r is non-zero and, if so, checks at 208 whether application of function F to further new first signature component r results in information $V_A$.

The process of determining a first signature component r by generating a private value $d_A$ and computing a corresponding public value R and first signature component r is repeated until the signer determines at 208 that information $V_A$ can be obtained by applying function F to first signature component r. Upon this determination, the signer proceeds at 210 to compute a second signature component s, according to equation 1:

$$s = d_A^{-1}(\text{Hash}(M) + rk_A)(\bmod n) \qquad (1)$$

where $d_A^{-1}$ denotes the inverse of private value $d_A$, and Hash is a cryptographic hash function, such as, for example, SHA-1 or any of the SHA2 functions, for example SHA-256. Although not explicitly shown, Hash(M) is converted to an integer for use in equation 1.

At 212, the signer determines whether second signature component s is non-zero, that is s≠0. If this condition is not satisfied, the signer returns to 202, generating yet another new private value $d_A$ and computing yet another new corresponding public value R. If the signer determines at 212 that second signature component s is non-zero, the signer signs message M with a signature (r, s) at 214 to form a signed message from first signature component r, from second signature component s, and from message M.

Figure 3:
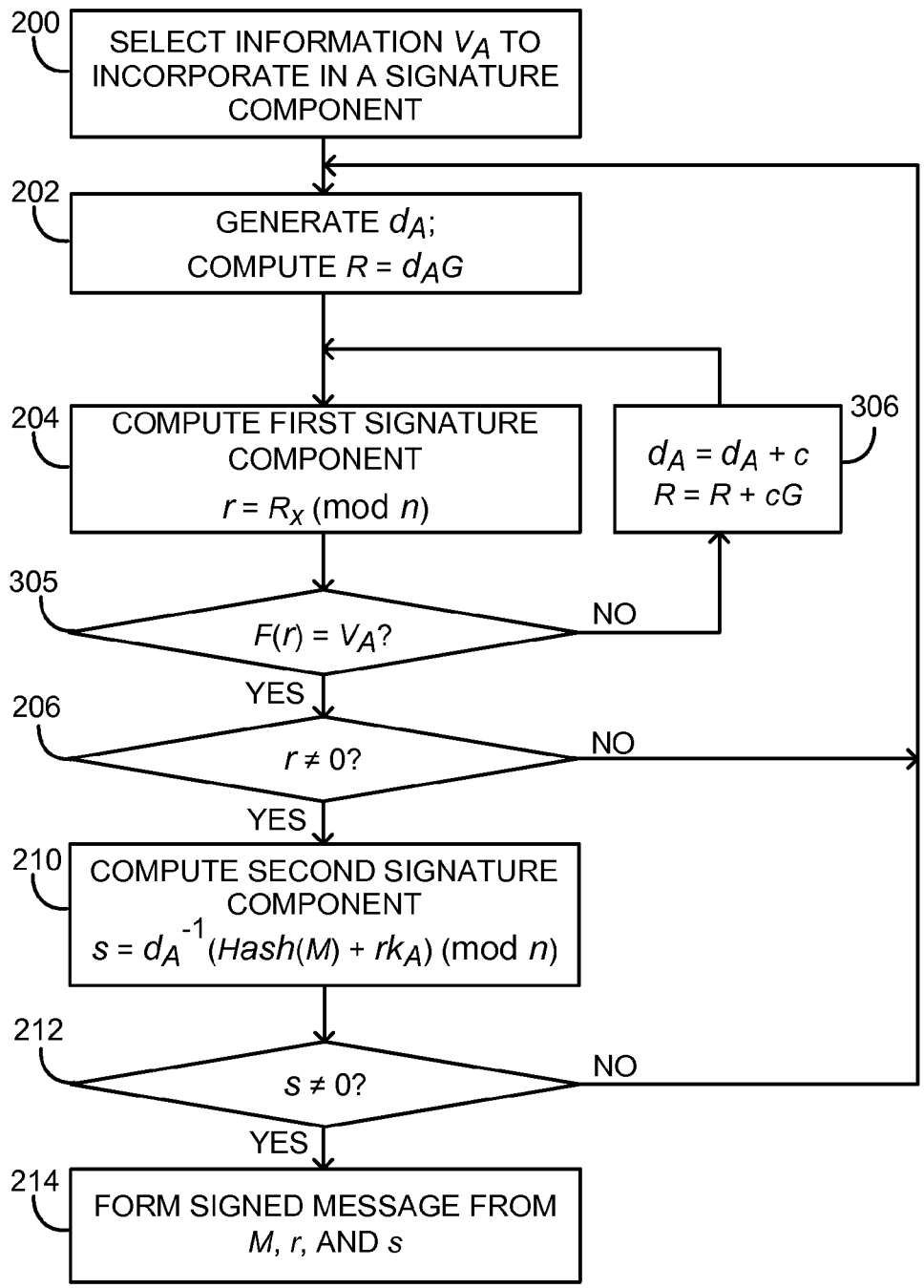
FIG. 3 is a simplified flowchart of another example method to be performed by a signer for incorporating information in a first signature component of an ECDSA signature.

FIG. 3 is a simplified flowchart of another example method to be performed by a signer for incorporating information in a first signature component of an ECDSA signature. This method includes a more efficient means of determining a signature component that incorporates selected information $V_A$.

As described above with respect to FIG. 2, the example method illustrated in FIG. 3 includes selection of information $V_A$ to be incorporated in first signature component r at 200, generation of private value $d_A$ and corresponding public value R at 202, and computation of first signature component r at 204. However, in this method, after computing first signature component r at 204, the signer proceeds to check at 305 whether application of known function F to first signature component r results in information $V_A$, that is $F(r)=V_A$. If the signer determines at 305 that application of function F to first signature component r does not result in information $V_A$, that is $F(r)\neq V_A$, then, rather than returning to 202 to generate a new private value $d_A$ from scratch, the signer proceeds at 306 to increment private value $d_A$ by a constant integer c, that is 'new $d_A$'='old $d_A$'+c. Accordingly, public value R is incremented by the product of constant c and base point G, that is 'new R'='old R'+cG. An example for the constant c is the value one, that is c=1, 'new $d_A$'='old $d_A$'+1, and 'new R'='old R'+G. The signer then proceeds to compute a new first signature component r at 204, and to check again at 305 if application of function F to new first signature component r results in $V_A$, that is F('new r')=$V_A$. Incrementing private value $d_A$ and public value R has the advantage that the signer may avoid performing a separate and lengthier computation of public value R, which requires the use of different point multiplication in each iteration. This may reduce the amount of computation time or computation power or both that is required to find a first signature component r that satisfies $F(r)=V_A$.

Once the signer determines at 305 that application of function F to first signature component r results in information $V_A$, that is $F(r)=V_A$, the signer proceeds to check at 206 whether first signature component r is non-zero, that is r≠0. If this condition is not satisfied, the signer returns to 202, generating a new private value $d_A$ and computing a new public value R. If the signer determines at 206 that first signature component r is non-zero, the signer proceeds to compute a second signature component s at 210 according to equation 1, checking at 212 whether second signature component s is non-zero, that is s≠0 and, if so, signing message M with a signature (r, s) to form a signed message at 214 from first signature component r, from second signature component s, and from message M.

Although not explicitly described, it is contemplated that the actions at 305 and 206 may be performed in a different order than that illustrated in FIG. 3, while still yielding the same results.

As an alternative to the example methods illustrated in FIG. 2 and FIG. 3, information $V_A$ could be incorporated in the second signature component s of the ECDSA signature, such that application of function F to second signature component s results in information $V_A$, that is $F(s)=V_A$.

Figure 4:
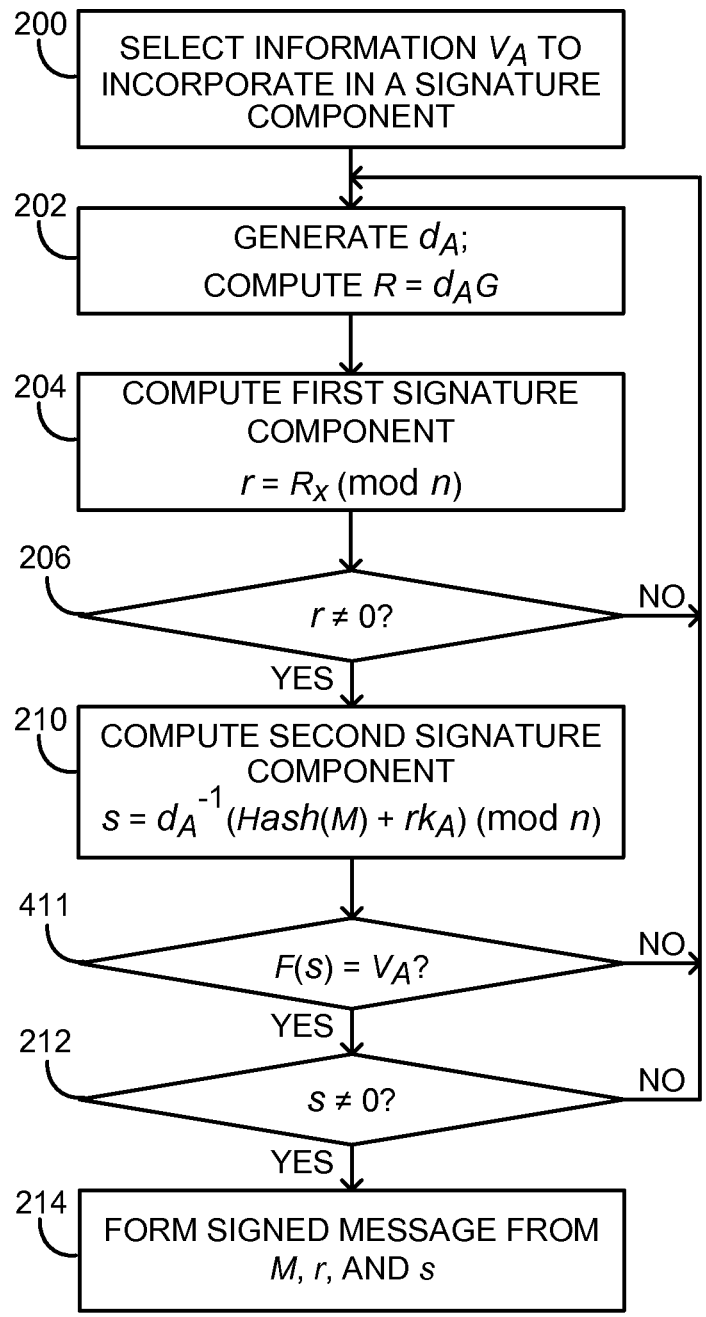
FIG. 4 is a simplified flowchart of an example method to be performed by a signer for incorporating information in a second signature component of an ECDSA signature.

For example, FIG. 4 is a simplified flowchart of an example method to be performed by a signer for incorporating information in a second signature component of an ECDSA signature. As described above with respect to FIG. 2, the example method illustrated in FIG. 4 includes selection of information $V_A$ to be incorporated in a signature component at 200. In this case, the signature component is a second signature component s. The method includes generation of private value $d_A$ and corresponding public value R at 202, computation of first signature component r at 204, and checking at 206 whether first signature component r is non-zero. However, in this method, if first signature component r is non-zero, the signer proceeds at 210 to compute a second signature component s, according to equation 1. Then the signer checks at 411 whether application of function F to second signature component s results in information $V_A$. If the signer determines at 411 that application of function F to second signature component s does not result in information $V_A$, that is $F(s)\neq V_A$, then the signer returns to 202, generating a new private value $d_A$ and computing a new public value R. Then the signer proceeds at 204 to compute a new first signature component r from new public value R. The signer checks at 206 whether new first signature component r is non-zero and, if so, computes a new second signature component s, according to equation 1. The signer then checks at 411 whether application of function F to new second signature component s results in information $V_A$.

The process of determining a first signature component r and calculating therefrom a second signature component s is repeated until the signer determines at 411 that information $V_A$ can be obtained by applying function F to second signature component s. Upon this determination, the signer checks whether second signature component s is non-zero, that is s≠0. If this condition is not satisfied, the signer returns to 202, generating yet another new private value $d_A$ and computing yet another new corresponding public value R. If the signer determines at 212 that second signature component s is non-zero, the signer proceeds to form a signed message at 214 from first signature component r, from second signature component s, and from message M. Although not explicitly described, it is contemplated that the actions at 411 and 212 may be performed in a different order than that illustrated in FIG. 4, while still yielding the same results.

Figure 5:
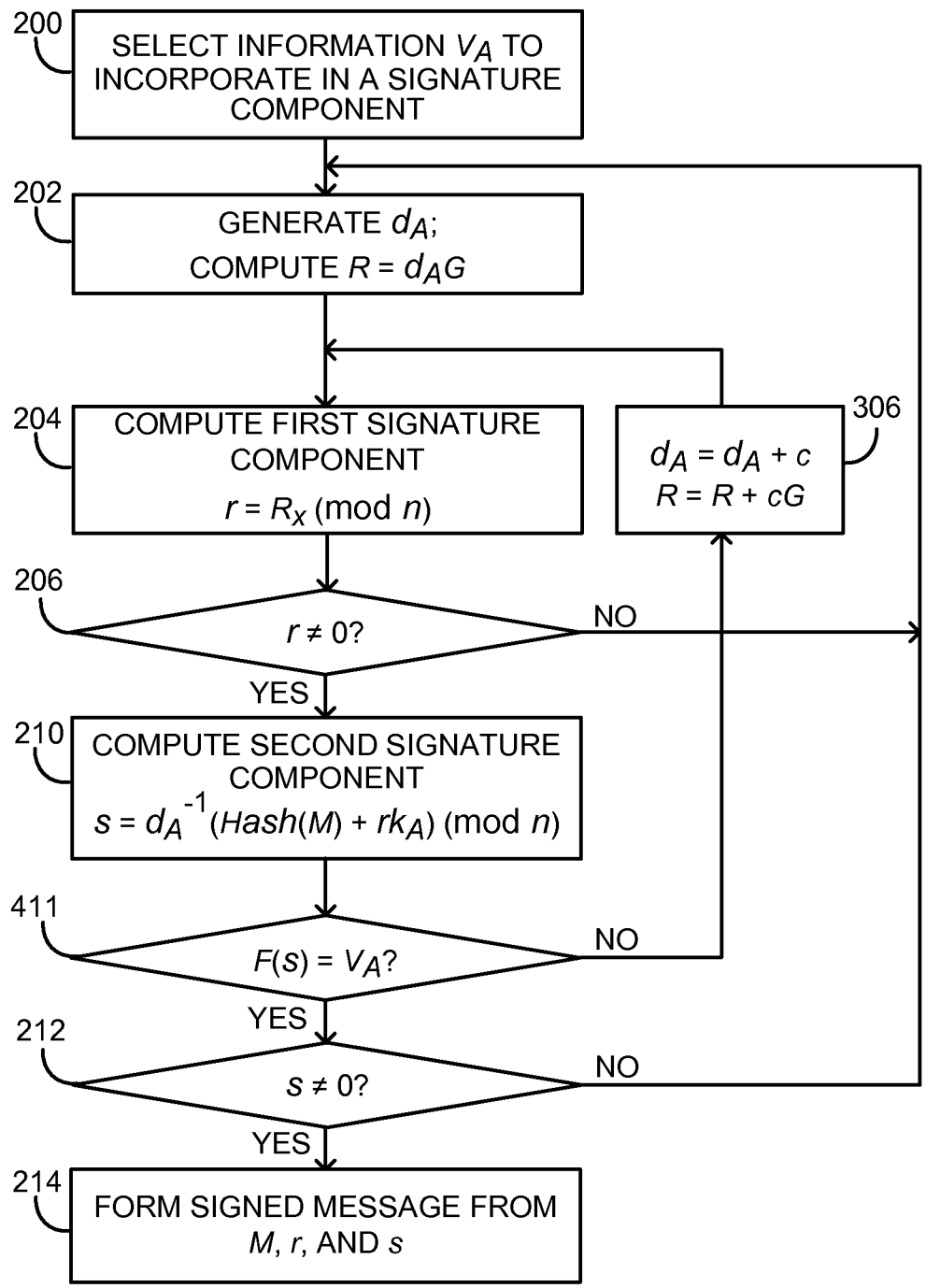
FIG. 5 is a simplified flowchart of another example method to be performed by a signer for incorporating information in a second signature component of an ECDSA signature.

FIG. 5 is a simplified flowchart of another example method to be performed by a signer for incorporating information in a second signature component of an ECDSA signature. This method includes a more efficient means of determining a first signature component from which a second signature component may be calculated that incorporates selected information $V_A$. As described above with respect to FIG. 4, the example method illustrated in FIG. 5 includes selection of information $V_A$ to be incorporated in second signature component s at 200, generation of private value $d_A$ and corresponding public value R at 202, computation of first signature component r at 204, checking at 206 whether first signature component r is non-zero, computation at 210 of second signature component s according to equation 1, and checking at 411 whether application of function F to second signature component s results in information $V_A$. However, in this method, if the signer determines at 411 that application of function F to second signature component s does not result in information $V_A$, that is $F(s) \neq V_A$, then, rather than returning to 202 to generate a new private value $d_A$ from scratch, the signer proceeds at 306 to increment private value $d_A$ by a constant integer c, that is 'new $d_A$'='old $d_A$'+c. Accordingly, public value R is incremented by the product of constant c and base point G, that is 'new R'='old R'+cG. An example for the constant c is the value one, that is c=1, 'new $d_A$'='old $d_A$'+1, and 'new R'='old R'+G. The signer proceeds to compute a new first signature component r at 204, to check whether new first signature component r is non-zero at 206, to compute a new second signature component s at 210, and to check again at 411 if application of function F to new second signature component s results in $V_A$, that is F('new s')=$V_A$. This is analogous to the incremental method described with respect to FIG. 3.

Upon determining at 411 that information $V_A$ can be obtained by applying function F to second signature component s, and upon verifying at 212 that second signature component s is non-zero, the signer forms a signed message at 214 as described with respect to FIGS. 2, 3 and 4. Although not explicitly shown, it is contemplated that the actions at 411 and 212 may be performed in a different order than that illustrated in FIG. 5, while still yielding the same results.

At this point, the signed message formed at 214 may be verified by any verifier using the ECDSA verification algorithm, which is known to those of ordinary skill in the art.

It is contemplated that a signed message may be formed as a reversible combination of first signature component r, of second signature component s, and of message M. For example, it is contemplated that a signature (r, s) could be formed from a concatenation of first signature component r and second signature component s, that is r∥s. and that the message M could be concatenated with the signature (r, s). Alternatively, if first signature component r and second signature component s are of variable length, it is contemplated, for example, that they could be reversibly combined using ASN.1 as described by Brown in "Standards for Efficient Cryptography SEC 1: Elliptic Curve Cryptography", Certicom Corp., May 21, 2009, and then combined with message M. ASN.1 involves the use of nested bit strings of the form TLV, where T is a short string indicating a type, L is a string indicating the length of next field V, and V is a value which can itself contain other TLVs. Therefore, to reversibly encode first signature component r and second signature component s, it is contemplated that one could use one outer TLV whose tag indicates that it is a sequence of values, and two inner TLVs that are included as part of the outer V field. It is primarily the length indicators that ensure the encoding is reversible. If the signed message is a reversible combination of first signature component r, of second signature component s, and of message M, a verifier may be able to extract each of these elements from the signed message.

Alternatively, it is also contemplated a signed message may be formed in such a way that the message M cannot be extracted by a verifier. For example, the signer may form a signed message as a reversible combination of first signature component r, of second signature component s, and of a hash of the message M, that is Hash(M). In this case, the message M is not directly obtainable from the hash value Hash(M) because the hash function is non-reversible. However, because it is the hash value Hash(M) which is used in the actual signing and verification formulas, the verifier may still verify that the signer has signed a message M that hashes to the hash value Hash(M), without being given explicit knowledge of the message M. There are some auction schemes and message commitment schemes that are conducted in this fashion.

Figure 6:
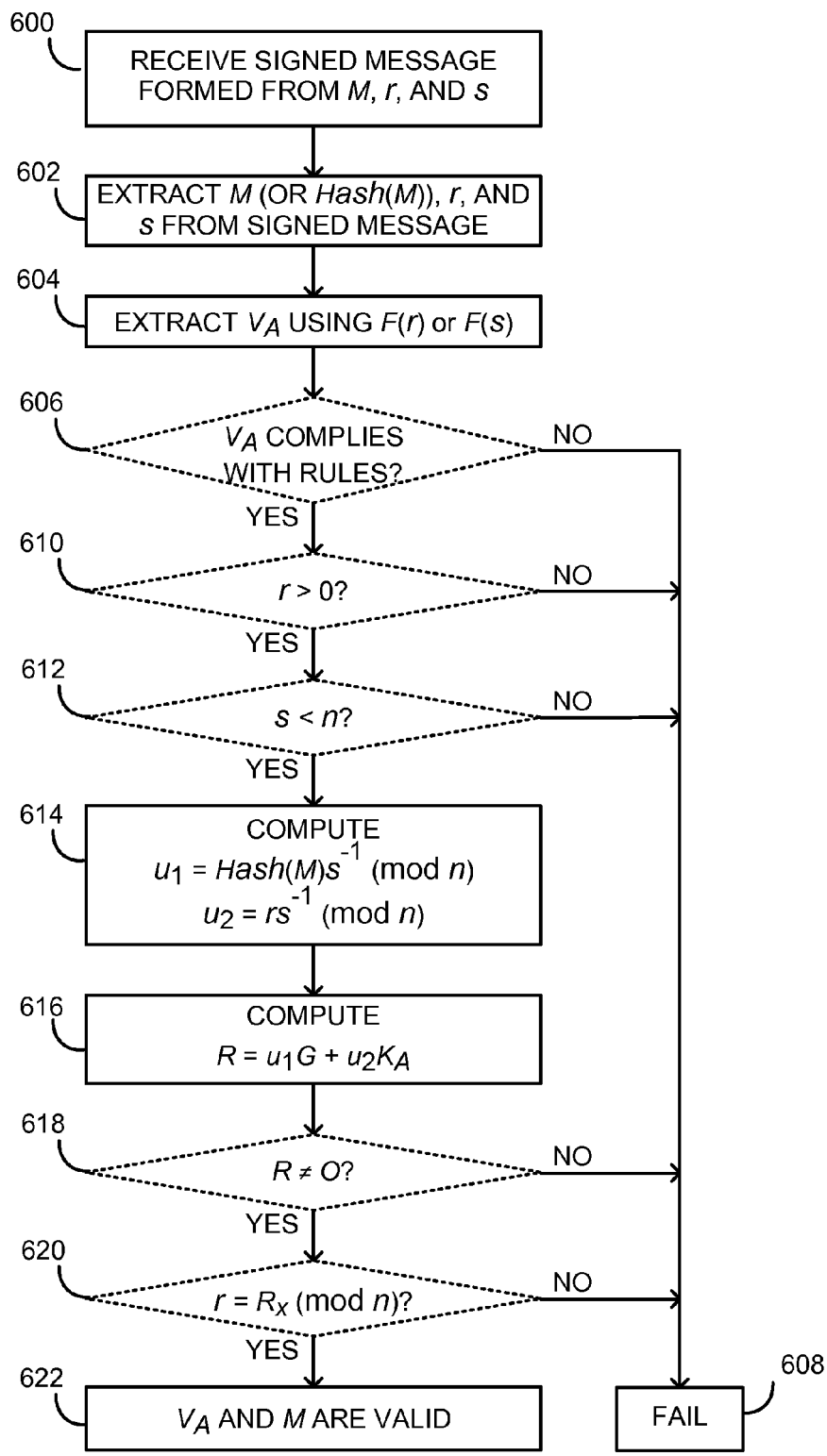
FIG. 6 is a simplified flowchart of an example method to be performed by a verifier for extracting information from a signature component of an ECDSA signature.

FIG. 6 is a simplified flowchart of an example method to be performed by a verifier for extracting information from a signature component of an ECDSA signature. At 600, the verifier receives a signed message which is purported to be signed by a particular signer. The signed message has been formed from a first signature component r, from a second signature component s, and from a message M. At 602, the verifier extracts first signature component r and second signature component s. Depending on how the signed message has been formed, at 602 the verifier also extracts either message M or hash value Hash(M) from the signed message. At 604, the verifier extracts information $V_A$ from first signature component r or alternatively from second signature component s by applying the known function F to the relevant signature component. At 606, the verifier may optionally check whether information $V_A$ complies with digital signature management rules known to or accessible by the verifier. If this condition is not satisfied, the method may end in failure at 608. If the verification at 606 is successful or is skipped, the verifier may optionally verify at 610 that first signature component r is greater than zero, that is r>0, and may optionally verify at 612 that second signature component s is less than prime number n, that is s<n. If either of these optional verifications fails, the method may end in failure at 606.

It is contemplated that the verifications at 606, 610 and 612 may be performed in a different order than that illustrated in FIG. 6, while still yielding the same results.

If each of the verifications at 606, 610, and 612 is successful or skipped, the verifier proceeds at 614 to compute values $u_1$ and $u_2$ according to equations 2 and 3, respectively:

$$u_1 = \text{Hash}(M)s^{-1} (\text{mod } n) \quad (2)$$

$$u_2 = rs^{-1} (\text{mod } n) \quad (3)$$

where $s^{-1}$ denotes the inverse of second signature component s, and Hash is the same cryptographic hash function that was used in the calculation of second signature component s in equation 1. As in equation 1, Hash(M) is converted to an integer for use in equation 2.

From values $u_1$ and $u_2$ computed at 614, and assuming that the verifier is in possession of an authenticated copy of public key $K_A$ of the signer, the verifier proceeds at 616 to calculate the signer's public value R according to equation 4:

$$R = u_1 G + u_2 K_A \quad (4)$$

At 618, the verifier may optionally verify that public value R is not the point at infinity, that is R≠O. If this condition is not satisfied, the method may end in failure at 608. If the verification at 618 is successful or skipped, the verifier may optionally proceed to verify at 620 that first signature component r is equal to the residue of the x-coordinate of public value R modulo prime number n, that is $r = R_x (\text{mod } n)$. If this condition is not satisfied, the method may end in failure at 608. It is contemplated that the optional verifications at 618 and 620 may be performed in a different order than that illustrated in FIG. 6, while still yielding the same results. If both of the verifications at 618 and 620 are successful or skipped, the verifier determines that information $V_A$ and message M are valid at 622. The actions taken at 606, at 610, at 612, at 618 and at 620 can collectively be referred to as verifying the signature (r, s).

In another application, this framework could be modified for general signed messages wherever the cost of bandwidth is considerably more valuable than the computational power of the signer. For example, information $V_A$ could be incorporated in a RSA signature s of a message M, such that application of a known function F to signature s results in information $V_A$, that is $F(s)=V_A$. In this case, $s=H(m)^d \pmod N$, where m is padded version of message M, N is a product of a first prime number p and a second prime number q, d is a coprime of a product (p−1)(q−1), and H is a randomized encoding method like the Rivset-Shamir-Adleman Signature Scheme with Appendix—Probabilistic Signature Scheme (RSASSA-PSS) as described by Kaliski in "Raising the Standard for RSA Signatures: RSA-PSS", RSA Laboratories, Feb. 26, 2003 (http://www.rsa.com/rsalabs/node.asp?id=2005).

Information $V_A$ could also be incorporated in cryptographic values of other signature schemes. For example, information $V_A$ could be incorporated in either a first signature component e or a second signature component s of any Schnorr-based signature scheme as described by Menezes et al. in Section 11.5.3 of "Handbook of Applied Cryptography", CRC Press, 1997. Briefly, this technique employs a subgroup of order q in $\mathbb{Z}_p^*$, where p is some large prime number. First signature component e may be obtained by hashing of a concatenation of a message M to be signed and a public value r, that is e=Hash(M||r), where public value r depends on a private integer value k of the signer, a generator a of $\mathbb{Z}_p^*$, and prime number p according to $r=a^k \pmod p$. Second signature component s may be obtained from first signature component e, a private value a of the signer, private value k, and integer q according to s=ae+k (mod q). A public value y of the signer satisfies $y=a^a \pmod p$. It is also contemplated that information $V_A$ could be incorporated in either a first signature component r or a second signature component s of any El Gamal-based signature scheme.

There may be cases where function F, when applied to a particular value (such as a first signature component r or a second signature component s), may never yield selected information $V_A$. In these cases a hash function could be applied to the particular value in question prior to applying function F. For example, application of function F to first signature component r at 208 in FIG. 2, at 305 in FIG. 3, or at 604 in FIG. 6, could be replaced by application of function F to a hash of first signature component r, that is F(Hash(r)). Similarly, application of function F to second signature component s at 411 in FIG. 4 or in FIG. 5, or at 604 in FIG. 6, could be replaced by application of function F to a hash of second signature component s, that is F(Hash(s)). This would provide the CA or signer with a new set of values for comparison with information $V_A$, which may improve the likelihood that a match will be found, that is $F(Hash(B_A))=V_A$ or F(Hash(r)) $=V_A$ or $F(Hash(s))=V_A$. However, it should be noted that the other entities involved in the protocol must also be aware when a hash function is being used. Alternatively, information $V_A$ could be selected so as to avoid the degenerate cases where application of function F never yields information $V_A$.

Figure 7:
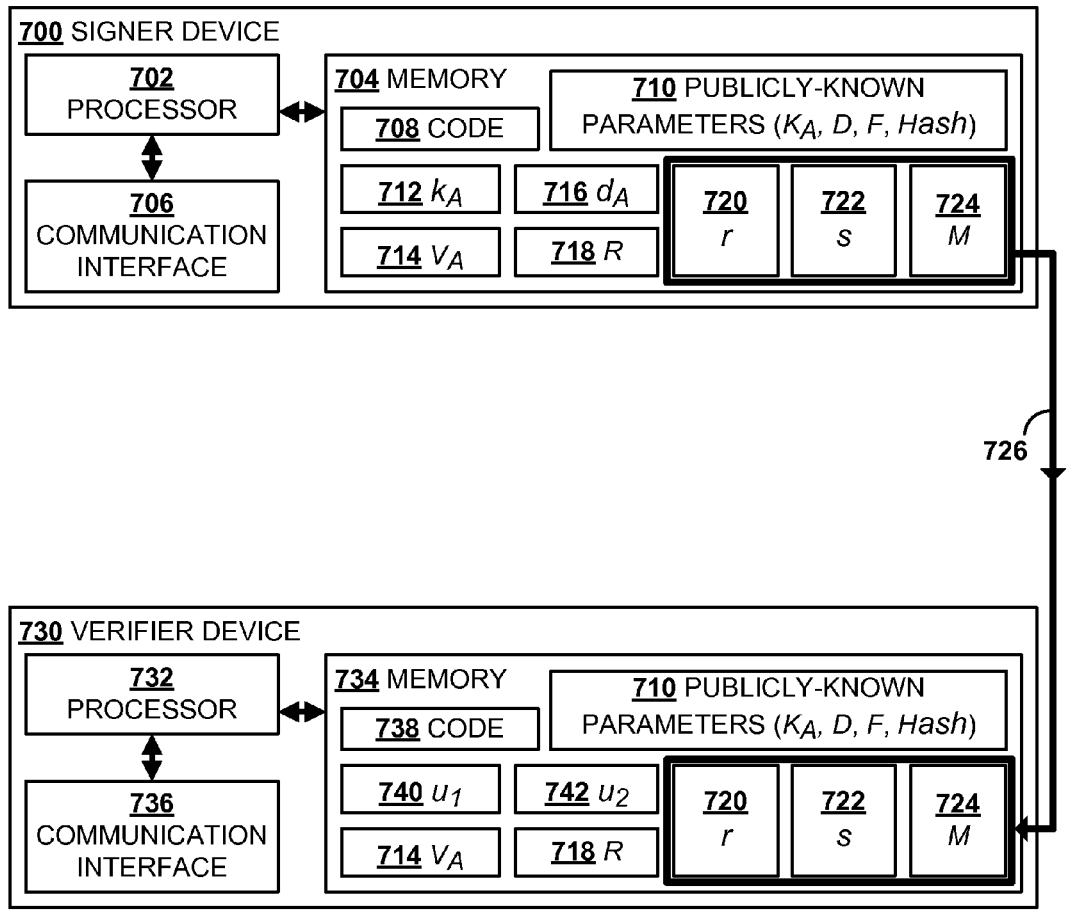
FIG. 7 is a simplified block diagram of a signer device and a verifier device.

FIG. 7 is a simplified block diagram of a signer device 700 and a verifier device 730.

Signer device 700 is able to perform one or more of the example methods illustrated in FIGS. 2, 3, 4 and 5. Signer device 700 comprises a processor 702 which is coupled to a memory 704 and to a communication interface 706. Signer device 700 may contain other elements which, for clarity, are not shown in FIG. 7.

Verifier device 730 is able to perform the example method illustrated in FIG. 6. Verifier device 730 comprises a processor 732 which is coupled to a memory 734 and to a communication interface 736. Verifier device 730 may contain other elements which, for clarity, are not shown in FIG. 7.

Communication interfaces 706 and 736 may be wired communication interfaces or wireless communication interfaces. For example, communication interfaces 706 and 736 may be Universal Serial Bus (USB) interfaces, Ethernet interfaces, Integrated Services Digital Network (ISDN) interfaces, Digital Subscriber Line (DSL) interfaces, Local Area Network (LAN) interfaces, High-Definition Multimedia (HDMI) interfaces, Digital Visual Interfaces (DVIs), or Institute of Electrical and Electronics Engineers (IEEE) 1394 interfaces such as i.LINK™, Lynx$^{SM}$ or Firewire®. Alternatively, communication interfaces 706 and 736 may be Wireless Local Area Network (WLAN) interfaces, short-range wireless communication interfaces such as Wireless Personal Area Network (WPAN) interfaces, or Wireless Wide Area Network (WWAN) interfaces.

Each of memories 704 and 734 is able to store publicly-known parameters 710, including a public key $K_A$ of signer device 700 as well as elliptic curve domain parameters D, function F, and hash function Hash that have been agreed on by signer device 700 and verifier device 730.

Memory 704 of signer device 700 is able to store code 708 that, when executed by processor 702, results in one or more of the example methods illustrated in FIGS. 2, 3, 4 and 5. Memory 704 may also store applications (not shown) installed in signer device 700 to be executed by processor 702.

Memory 704 is able to store a private key $k_A$ 712 of signer device 700 that corresponds to public key $K_A$ of signer device 700, as well as selected information $V_A$ 714, a private value $d_A$ 716, and a public value R 718. Memory 704 is also able to store a first signature component r 720, a second signature component s 722, and a message to be signed M 724.

As denoted by arrow 726, first signature component r 720, second signature component s 722, and message M 724 are able to be sent to verifier device 730 as a signed message, where they may be stored in memory 734 of verifier device 730. While not explicitly shown, the signed message may be sent from signer device 700 via communication interface 706 and may be received by verifier device 730 via communication interface 736. Although not explicitly shown in FIG. 7, as described above, the signed message may alternatively comprise a hash of message M, that is Hash(M), instead of message M 724 itself.

Memory 734 of verifier device 730 is able to store code 738 that, when executed by processor 732, results in the example method illustrated in FIG. 6. Memory 734 may also store applications (not shown) installed in verifier device 730 to be executed by processor 732.

Memory 734 is further able to store value $u_1$ 740, value $u_2$ 742, information $V_A$ 714, and public value R 718 of signer device 700, where these values may be determined upon receipt of the signed message from signer device 700.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A non-transitory computer-readable storage medium containing computer-executable instructions which, when executed by a processor, result in the processor:
selecting particular information [$V_A$] to be incorporated in a first signature component [r] of a signature on a message [M] to be signed;

performing an iterative process of generating the first signature component [r] and applying a known function [F] to the first signature component [r], wherein the iterative process is repeated until applying the known function [F] to the first signature component [r] extracts the particular information [$V_A$];

calculating a second signature component [s] of the signature from the first signature component [r], from a private key [$k_A$], from a private integer value [$d_A$], and from a message-dependent value that is dependent on the message [M]; and forming a signed message from the first signature component [r], from the second signature component [s], and from one of the message [M] and the message- dependent value.

2. The non-transitory computer-readable storage medium as claimed in claim 1, wherein the particular information [$V_A$] comprises information related to one or more of the message [M] and a signer of the message [M].

3. The non-transitory computer-readable storage medium as claimed in claim 1, wherein the message- dependent value comprises a hash of the message [Hash(M)].

4. The non-transitory computer-readable storage medium as claimed in claim 1, wherein the iterative process comprises:

selecting the private integer value [$d_A$] and computing a public value [R] from the private integer value [$d_A$] and from a generator [G] of a finite cyclic group such that the public value [R] is included in the finite cyclic group;

calculating the first signature component [r] from the public value [R]; and determining whether applying the known function [F] to the first signature component [r] extracts the particular information [$V_A$].

5. The non-transitory computer-readable storage medium as claimed in claim 4, wherein in the event that applying the known function [F] to the first signature component [r] does not result in the particular information [$V_A$], the computer-executable instructions further result in the processor:

selecting a new private integer value [new $d_A$] and computing a new public value [R] from the new private integer value [new $d_A$] and from the generator [G] of the finite cyclic group such that the new public value [new R] is included in the finite cyclic group;

calculating a new first signature component [new r] from the new public value [new R]; and determining whether applying the known function [F] to the new first signature component [new r] extracts the particular information [$V_A$].

6. The non-transitory computer-readable storage medium as claimed in claim 4, wherein in the event that applying the known function [F] to the first signature component [r] does not result in the particular information [$V_A$], the computer-executable instructions further result in the processor:

calculating an incremented private integer value [$d_A$ +c] as a sum of the private integer value [$d_A$] and a constant integer [c];

calculating an incremented public value [R+cG] as a sum of the public value [R] and a product of the constant integer [c] and the generator [G], wherein the incremented public value [R+cG] is included in the finite cyclic group; and determining whether applying the known function [F] to the incremented public value [R+cG] extracts the particular information [$V_A$].

7. A non-transitory computer-readable storage medium containing computer-executable instructions which, when executed by a processor, result in the processor:

selecting particular information [$V_A$] to be incorporated in a second signature component [s] of a signature on a message [M] to be signed;

performing an iterative process of generating a first signature component [r] of the signature, calculating the second signature component [s] from the first signature component [r], from a private key [$k_A$], from a private integer value [$d_A$], and from a message-dependent value that is dependent on the message [M], and applying a known function [F] to the second signature component [s], wherein the iterative process is repeated until applying the known function [F] to the second signature component [s] extracts the particular information [$V_A$]; and forming a signed message from the first signature component [r], from the second signature component [s], and from one of the message [M] and the message- dependent value.

8. The non-transitory computer-readable storage medium as claimed in claim 7, wherein the particular information [$V_A$] comprises information related to one or more of the message [M] and a signer of the message [M].

9. The non-transitory computer-readable storage medium as claimed in claim 7, wherein the message- dependent value comprises a hash of the message [Hash(M)].

10. The non-transitory computer-readable storage medium as claimed in claim 7, wherein the iterative process comprises:

selecting the private integer value [$d_A$] and computing a public value [R] from the private integer value [$d_A$] and from a generator [G] of a finite cyclic group such that the public value [R] is included in the finite cyclic group;

calculating the first signature component [r] from the public value [R];

calculating the second signature component [s] from the first signature component [r], from the private key [kA], from the private integer value [$d_A$], and from the message-dependent value; and determining whether applying the known function [F] to the second signature component [s] extracts the particular information [$V_A$].

11. The non-transitory computer-readable storage medium as claimed in claim 10, wherein in the event that applying the known function [F] to the second signature component [s] does not result in the particular information [$V_A$], the computer-executable instructions further result in the processor:

selecting a new private integer value [new $d_A$] and computing a new public value [R] from the new private integer value [new $d_A$] and from the generator [G] of the finite cyclic group such that the new public value [new R] is included in the finite cyclic group;

calculating a new first signature component [new r] from the new public value [new R];

calculating a new second signature component [new s] from the new first signature component [new r], from the private key [$k_A$], from the private integer value [$d_A$] and from the message-dependent value; and determining whether applying the known function [F] to the new second signature component [new s] extracts the particular information [$V_A$].

12. The non-transitory computer-readable storage medium as claimed in claim 10, wherein in the event that applying the known function [F] to the second signature component [s] does not result in the particular information [$V_A$], the computer-executable instructions further result in the processor:

calculating an incremented private integer value [$d_A$ +c] as a sum of the private integer value [$d_A$] and a constant integer [c];

calculating an incremented public value [R+cG] as a sum of the public value [R] and a product of the constant integer [c] and the generator [G], wherein the incremented public value [R+cG] is included in the finite cyclic group;

calculating a new first signature component [new r] from the incremented public value [R+cG];

calculating a new second signature component [new s] from the new first signature component [new r], from the private key [$k_A$], from the private integer value [$d_A$] and from the message-dependent value; and determining whether applying the known function [F] to the new second signature component [new s] extracts the particular information [$V_A$].

13. A non-transitory computer-readable storage medium containing computer-executable instructions which, when executed by a processor, result in the processor:

receiving a signed message purported to be signed by a signer, the signed message having been formed from a first signature component [r] of a signature, from a second signature component [s] of the signature, and from one of a message [M] and a hash of the message [Hash(M)], wherein Hash is a cryptographic hash function that was used by the signer to calculate the second signature component [s];

extracting the first signature component [r], the second signature component [s], and one of the message [M] and the hash of the message [Hash(M)];

applying a known function [F] to the first signature component [r] or to the second signature component [s] to extract information [$V_A$]; and checking the validity of the extracted information [$V_A$] by:
calculating a first value [ul] and a second value [u2] using the equations $$u_1 = \text{Hash}(M)s^{-1} \pmod{n}$$

$$u_2 = rs^{-1} \pmod{n}$$

wherein $s^{-1}$ is the inverse of the second signature component [s], wherein n is the smallest positive prime number such that a product of the prime number [n] and a generator [G] of a finite cyclic group is equal to a point at infinity [0], and wherein Hash(M) has been converted to an integer;

calculating a public value [R] of the signer using the equation $$R = u_1 G + u_2 k_a$$

wherein $K_A$ is a public key of the signer that forms a key pair with a private key [$k_A$] of the signer; and comparing the first signature component [r] to $R_x$ (mod n), wherein $R_x$ is the residue of the x-coordinate of the public value [R] of the signer.

14. The non-transitory computer-readable storage medium as claimed in claim 13, wherein the extracted information [$V_A$] comprises information related to one or more of the signer and the message [M].

15. The non-transitory computer-readable storage medium as claimed in claim 13, wherein checking the validity of the extracted information [$V_A$] comprises:

checking whether the extracted information [$V_A$] complies with digital signature management roles accessible by the verifier.

* * * * *

UNITED STATES PATENT AND TRADEMARK OFFICE
CERTIFICATE OF CORRECTION

| | | |
|---|---|---|
| PATENT NO. | : 8,972,738 B2 | Page 1 of 1 |
| APPLICATION NO. | : 14/218513 | |
| DATED | : March 3, 2015 | |
| INVENTOR(S) | : Herbert Anthony Little et al. | |

It is certified that error appears in the above-identified patent and that said Letters Patent is hereby corrected as shown below:

In the Claims

Column 14, Line 16, In Claim 13, delete "$R=u_1G+u_2k_a$" and insert -- $R=u_1G+u_2k_A$ --, therefor.

Column 14, Line 31, In Claim 15, delete "roles" and insert -- rules --, therefor.

Signed and Sealed this
Thirtieth Day of June, 2015

Michelle K. Lee
*Director of the United States Patent and Trademark Office*